(12) United States Patent
Mastro et al.

(10) Patent No.: US 6,916,232 B2
(45) Date of Patent: Jul. 12, 2005

(54) APPARATUS FOR SUPERPOLISHING THE INSIDE SURFACE OF A SEAM OF A CONTINUOUS PHOTORECEPTOR BELT

(75) Inventors: Paul F. Mastro, Little Rock, AR (US); Daniel L. Coughlin, Jr., Elba, NY (US)

(73) Assignee: Xerox Corporation, Stamford, CT (US)

( * ) Notice: Subject to any disclaimer, the term of this patent is extended or adjusted under 35 U.S.C. 154(b) by 565 days.

(21) Appl. No.: 10/172,873

(22) Filed: Jun. 14, 2002

(65) Prior Publication Data

US 2003/0232583 A1 Dec. 18, 2003

(51) Int. Cl.$^7$ .............................................. B24B 31/00
(52) U.S. Cl. ....................... 451/109; 451/184; 451/212; 451/218; 451/306
(58) Field of Search ................................ 451/184, 108, 451/109, 212, 218, 213, 242, 300, 304, 305, 303, 306

(56) References Cited

U.S. PATENT DOCUMENTS

| | | | | |
|---|---|---|---|---|
| 3,728,066 A | * | 4/1973 | Stadler et al. | 425/471 |
| 5,418,349 A | * | 5/1995 | Swain et al. | 219/121.84 |
| 5,484,322 A | * | 1/1996 | Nagai et al. | 451/5 |
| 5,549,193 A | * | 8/1996 | Schlueter, Jr. et al. | 198/844.2 |
| 6,001,006 A | * | 12/1999 | Pineau et al. | 451/297 |
| 6,068,722 A | * | 5/2000 | Yu et al. | 156/137 |
| 6,368,440 B1 | | 4/2002 | Yu et al. | 156/137 |
| 6,848,978 B2 | * | 2/2005 | Mastro et al. | 451/51 |

* cited by examiner

Primary Examiner—Eileen P Morgan
(74) Attorney, Agent, or Firm—Tallam I. Nguy

(57) ABSTRACT

Apparatus is provided for superpolishing the inside diameter surface of a seam of a flexible continuous photoreceptor belt. The apparatus includes (a) spaced apart support rollers for supporting the inside surface of the flexible continuous photoreceptor belt into a loop having strands, including a seam strand, between adjacent rollers; (b) a polishing machine mounted adjacent the seam strand, the polishing machine having: (i) polishing forms defining a path for the seam strand; (ii) a rotatable drum for supporting and carrying a polishing media material against the inside surface of the seam on the seam strand, (iii) sets of pinch rolls for clamping the seam strand and straddling the seam thereon; (iv) polishing media material mounted over the rotatable drum and through the path between the polishing forms for contacting the inside surface of the seam; and (v) a reciprocating superpolishing head for reciprocating relative to a width of the flexible continuous belt and a length of the seam, thereby simultaneously (x) reciprocating the superpolishing head in contact with the inside surface of the seam along the length thereof, (y) moving the seam with the sets of pinch rolls, and (z) rotating the drum for move the polishing media material in polishing contact with the inside surface of the seam and across a width of the seam to achieve required random superpolishing motion against the inside surface of the seam.

5 Claims, 2 Drawing Sheets

APPARATUS FOR SUPERPOLISHING THE INSIDE SURFACE OF A SEAM OF A CONTINUOUS PHOTORECEPTOR BELT

FIELD OF THE DISCLOSURE

This application relates generally to photoreceptor belts used in xerography, and more particularly to apparatus for superpolishing the inside diameter of a seam of a continuous photoreceptor belt in order to prevent imaging distortions.

BACKGROUND OF THE DISCLOSURE

U.S. Pat. No. 6,368,440 issued Apr. 2002 to Yu et al., and entitled "Method for fabricating a flexible belt with a puzzle-cut seam" and commonly assigned, discloses a method that includes the steps of first, joining the two belt ends to form a juncture; second, applying an adhesive strip to the juncture; third, applying a compressing force to the adhesive strip; fourth, heating the adhesive strip for a heating period; fifth, cooling the adhesive strip for a cooling period; thus forming a puzzle-cut seam.

It was suggested in Yu et al. to use a mechanical polishing step to remove the adhesive from the outer belt surface and smooth out the seam profile in an attempt to achieving nil differential seam thickness in the treated puzzle-cut seam. It was understood that, while adhesive material was removed from the outer belt surface of the seam to achieve the nil differential seam thickness, there substantially remained that portion of the adhesive material that had previously flowed into and filled the crevices between the mating first and second puzzle-cut patterns of fingers of the belt ends and bonded to the interfaces of such fingers to form the seam. Despite this, it has been found necessary as disclosed in commonly assigned U.S. application Ser. No. 09/723,150, to attempt particular methods and apparatus to further refinish the external surface of such a seam of such belts in order to make such external surface suitable for imaging or imageable.

However, it has been found that the adhesive applied to such a seam flows through the crevices and together with any lack of complete smoothness on the inside surface of the seam, undesirably leaves a non-smooth surface or bump or residue on the inside surface of such a seam. Although such non-smoothness, or such bump on the inside surface of the seam can still leave the outer surface of seam "imageable", the non-smoothness or bump on the inside surface of the seam however causes imaging disturbances as such inside surface rides over belt supporting rollers or backer bars during imaging steps. Such imaging disturbances have been found to undesirably result in image "ghosts" or distortions.

Ordinarily, principles of precision or "superpolishing" of a surface require moving the polishing media across the surface to be polished in a random manner. This is accomplished by moving the polishing media simultaneously in two directions (X, Y) while in contact with the surface to be polished. Unfortunately however, this cannot done as is when the surface to be polished is part of the inside diameter surface of a flexible belt because the enclosed and confined areas therein tend to restrict the use of conventional polishing equipment.

There is therefore a need for apparatus for superfinishing and superpolishing the inside surface of photoreceptor belt seems so as to prevent such image distortions.

SUMMARY OF THE DISCLOSURE

In accordance with one aspect of the disclosure, there is provided apparatus for superpolishing the inside diameter surface of a seam of a flexible continuous photoreceptor belt. The apparatus includes (a) spaced apart support rollers for supporting the inside surface of the flexible continuous photoreceptor belt into a loop having strands, including a seam strand, between adjacent rollers; (b) a polishing machine mounted adjacent the seam strand, the polishing machine having: (i) polishing forms defining a path for the seam strand; (ii) a rotatable drum for supporting and carrying a polishing media material against the inside surface of the seam on the seam strand, (iii) sets of pinch rolls for clamping the seam strand and straddling the seam thereon; (iv) polishing media material mounted over the rotatable drum and through the path between the polishing forms for contacting the inside surface of the seam; and (v) a reciprocating superpolishing head for reciprocating relative to a width of the flexible continuous belt and a length of the seam, thereby simultaneously (x) reciprocating the superpolishing head in contact with the inside surface of the seam along the length thereof, (y) moving the seam with the sets of pinch rolls, and (z) rotating the drum for move the polishing media material in polishing contact with the inside surface of the seam and across a width of the seam to achieve required random superpolishing motion against the inside surface of the seam

BRIEF DESCRIPTION OF THE DRAWINGS

In the detailed description presented below, reference is made to the drawings in which.

DETAILED DESCRIPTION OF AN EXEMPLARY EMBODIMENT

While the present invention will be described in connection with a preferred embodiment thereof, it will be understood that it is not intended to limit the invention to this embodiments. On the contrary, it is intended to cover all alternatives, modifications, and equivalents as may be included within the spirit and scope of the invention as defined by the appended claims.

Figure 1:
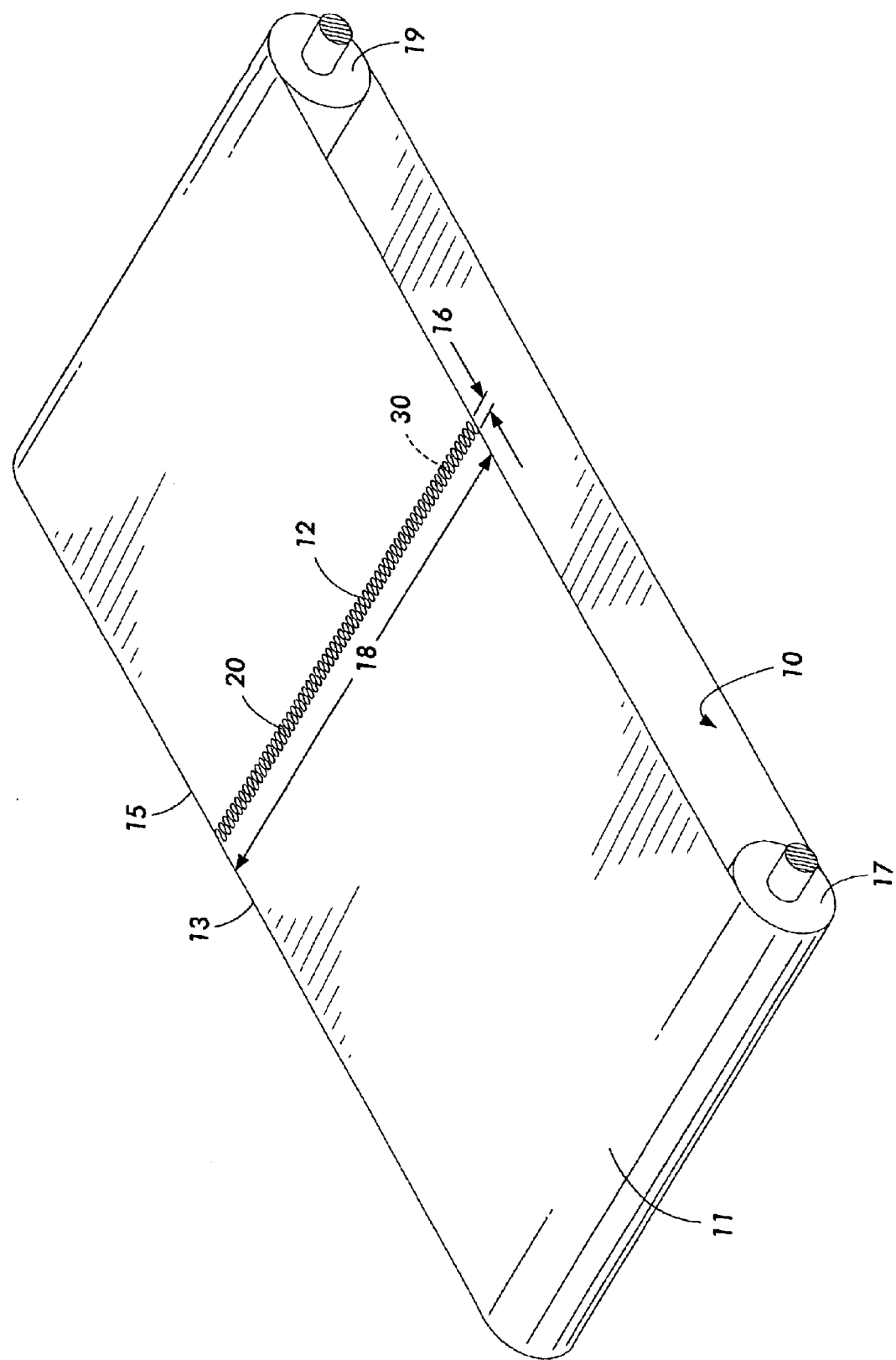
FIG. 1 is a schematic perspective illustration of a continuous photoreceptor belt having a seam for superpolishing in accordance with the present disclosure.

Referring now to FIG. 1, there is shown a flexible photoreceptor or imaging belt 10 with a first end 13 and a second end 15, the two ends 13 and 15 being joined by a puzzle-cut seam 12 fabricated and finished in accordance with the present disclosure. As shown, the length of flexible belt 10 extending between the two ends 13 and 15 is mountable in a machine on rollers such as 17 and 19. A drawing similar to FIG. 1 may be found in Yu et al. (FIG. 1) the disclosure of which U.S. patent is hereby incorporated herein by reference verbatim, with the same effect as though such disclosure were fully and completely set forth herein. The belt 10 which has an outer surface 11 and an inner surface 14, includes the seam 12 that can be superfinished and superpolished using the superpolishing apparatus 100 (FIG. 2) of the present disclosure. The seam 12 has a width 16, a length 18, an outer surface 20, an inner surface 30. The seam 12 also still has residual adhesive material that was used in bonding together as in Yu et al., the ends 13 and 15 of the belt 10 to form the seam 12.

Figure 2:
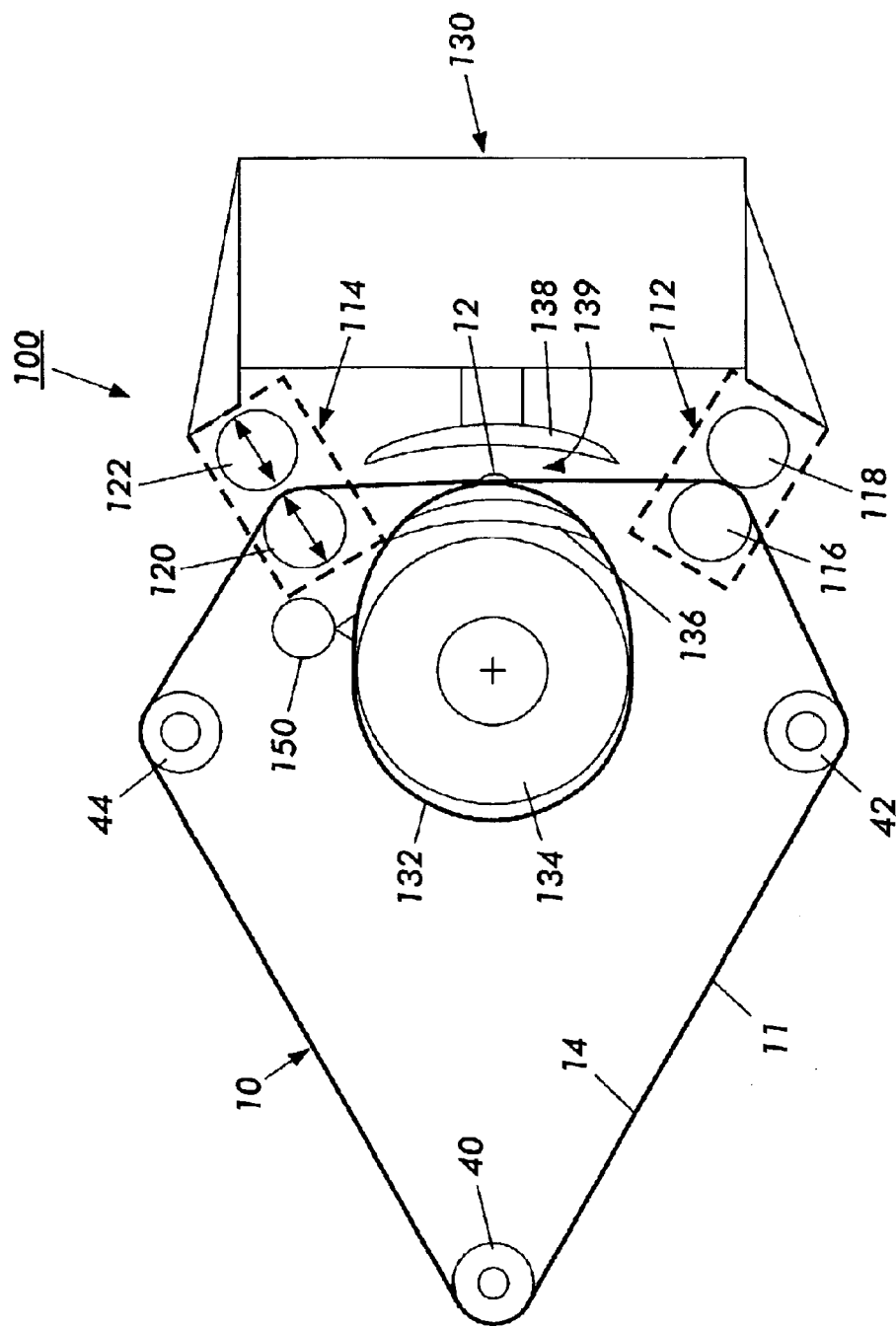
FIG. 2 is a schematic illustration of the superpolishing apparatus for superpolishing the inside diameter of a seam of a continuous photoreceptor belt in accordance with the present disclosure.

Referring now to FIGS. 1–2, in order to super finish the inside surface 30 of the seam 12 so that during imaging there are no belt movement disturbances resulting in image distortions such as image "ghosts" for example, there is provided the superpolishing apparatus 100 of the present disclosure. As illustrated, the superpolishing apparatus 100 includes a polishing machine 110 and a series of rollers 40, 42 and 44 for example. The rollers 40, 42 and 44 are arranged for mounting the belt 10 in tension and for presenting the inside surface 14 thereof to the polishing machine 110. The roller 40 for example can be an adjustable belt tensioning roller.

The polishing machine 110 includes first and second sets 112 and 114 of pinch rolls 116, 118 and 120, 122 that are used to clamp the belt 10 towards each of its ends 13, and 15 on opposite sides of the seam 12, thus presenting the seam 12 and seamed area of the belt to a reciprocating superpolishing head 130 of the polishing machine 110 that supports polishing media 132. As illustrated, the reciprocating superpolishing head 130 includes a reciprocating drive assembly shown generally as 133, a rotatable drum 134, and polishing forms 136, 138 that together support the polishing media material 132, such as polishing paper, relative to the inside diameter surface 14, 30 of the belt 10 and seam 12. The polishing media or paper 132 can for example comprise paper type 3M261X Imperial Lapping film or paper type 3M262L Imperial Microfinishing paper both available from a variety of sources including, for example, Abrasive Tool Corporation.

Thus in accordance the present disclosure, the belt 10 is supported over the rollers 40, 42, and 44 such that the drum 134 of the head 130 is located within the inside diameter surface 14 of belt 10. The polishing media 132 is also mounted within the inside diameter surface 14 for movement by and with the drum 134. Thus as the drum 134 turns rotatably, the paper or polishing media 132 also turns or rotates in a circular direction with it. The polishing media 132 is directed to move between the polishing form 136 and the inside surface 14 of belt 10, and particularly the inside surface 30 of the seam 12. As described above, the sets 112 and 114 of pinch rolls are mounted to the reciprocating superpolishing head 130, are used for clamping the belt 10, and for presenting the inside surface 30 of the seam 12 to the polishing media 132.

Because the sets 112, 114 of pinch rolls are mounted to the reciprocating superpolishing head 130, as the reciprocating superpolishing head 130 moves, the belt 10 clamped thereby, and the seam 12 thereon, will also move with the head 130. This movement coupled with the circular movement of the paper or media 132 results in a random polishing motion by the polishing media on the inside surface 30 of the seam 12, and thus provides required quality superpolishing of the inside surface 30 required for preventing imaging disturbances and image "ghosts".

The purpose of the polishing forms 136, 138 is for insuring a controlled contact area, as well as controlled contact pressure of the polishing media or paper 132 with the inside surface 30 of the seam 12. Such contact area and pressure will vary depending on, among other things, belt inside diameter, belt thickness, belt material, seam width and seam configuration.

As further illustrated, the superpolishing apparatus 100 includes a coolant delivery device 150 that may be mounted relative to the reciprocating superpolishing head 130 for cooling the work piece (the seam) and the polishing media. The purpose of the adjustable tensioning roll 40 is for supporting the belt 10, and for assisting in the loading, unloading and positioning of the belt 10 over the supporting rollers 40, 42, 44. Depending on belt size, the adjustability of the roller 40 can be provided by springs, counterweights or an air cylinder.

The polishing machine 110 may comprise a grinder such as one obtainable from Grinding Equipment and Machinery Company, 15 Worthington Street, Youngstown, Ohio 44502, equipped with a 16-inch superpolishing reciprocating head.

To prevent any image distortions or ghosts, adhesive residue, which causes bumpiness in the movement of the inside surface 30 of the seam 12 over belt support rollers or backer bars, has to be removed smoothly and without damaging seam integrity. In accordance with the present disclosure, this achieved by modifying superpolishing techniques currently being used for polishing the outside diameter surfaces of work pieces. With such modifications, the inside diameter surface 30 of the seam 12 of the belt 10 can be finished similar to belt tolerances for thickness, surface roughness and gloss of the outside or outer surface 16 of such seam. This facilitates imaging across the seamed area at acceptable levels of copy quality.

As can be seen, there has been provided apparatus for superpolishing the inside diameter surface of a seam of a flexible continuous photoreceptor belt. The apparatus includes (a) spaced apart support rollers for supporting the inside surface of the flexible continuous photoreceptor belt into a loop having strands, including a seam strand, between adjacent rollers; (b) a polishing machine mounted adjacent the seam strand, the polishing machine having: (i) polishing forms defining a path for the seam strand; (ii) a rotatable drum for supporting and carrying a polishing media material against the inside surface of the seam on the seam strand, (iii) sets of pinch rolls for clamping the seam strand and straddling the seam thereon; (iv) polishing media material mounted over the rotatable drum and through the path between the polishing forms for contacting the inside surface of the seam; and (v) a reciprocating superpolishing head for reciprocating relative to a width of the flexible continuous belt and a length of the seam, thereby simultaneously (x) reciprocating the superpolishing head in contact with the inside surface of the seam along the length thereof, (y) moving the seam with the sets of pinch rolls, and (z) rotating the drum for move the polishing media material in polishing contact with the inside surface of the seam and across a width of the seam to achieve required random superpolishing motion against the inside surface of the seam.

While various embodiments of a method of finishing a belt seam, an imageable photoreceptor belt finished in accordance with the same method, and a printing machine with an imageable photoreceptor belt finished in accordance with the same method, in accordance with the present disclosure, have been described hereinabove, the scope of the disclosure is defined by the following claims.

What is claimed is:

1. Apparatus for superpolishing the inside diameter surface of a seam of a flexible continuous photoreceptor belt to prevent imaging disturbances and image "ghosts", the apparatus comprising:
   (a) spaced apart support rollers for supporting the inside surface of the flexible continuous photoreceptor belt into a loop having strands including a seam strand between adjacent rollers;
   (b) a polishing machine mounted adjacent said seam strand, said polishing machine having:
      (i) polishing forms defining a path for said seam strand;
      (ii) a rotatable drum for supporting and carrying a polishing media material against the inside surface of the seam on said seam strand, (iii) sets of pinch rolls for clamping said seam strand and straddling the seam thereon;

(iv) polishing media material mounted over said rotatable drum and through said path between said polishing forms for contacting the inside surface of the seam; and (v) a reciprocating superpolishing head for reciprocating relative to a width of the flexible continuous belt and a length of the seam, thereby simultaneously (x) reciprocating said superpolishing head in contact with the inside surface of the seam along the length thereof, (y) moving said seam with said sets of pinch rolls, and (z) rotating said drum for move said polishing media material in polishing contact with the inside surface of the seam and across a width of the seam to achieve required random superpolishing motion against the inside surface of the seam.

2. The apparatus of claim 1, wherein said spaced apart support rollers include a tensioning roller.

3. The apparatus of claim 1, wherein said polishing machine further includes a coolant delivery apparatus for cooling the seam and said polishing media material.

4. The apparatus of claim 1, wherein said polishing media material comprises paper type 3M261X Imperial Lapping film.

5. The apparatus of claim 1, wherein said polishing media is mounted for movement against the inside diameter surface of the seam.

* * * * *